Aug. 27, 1946.  H. W. LENSNER  2,406,616
CARRIER-CURRENT PROTECTIVE RELAYING SYSTEMS
Filed Dec. 8, 1942

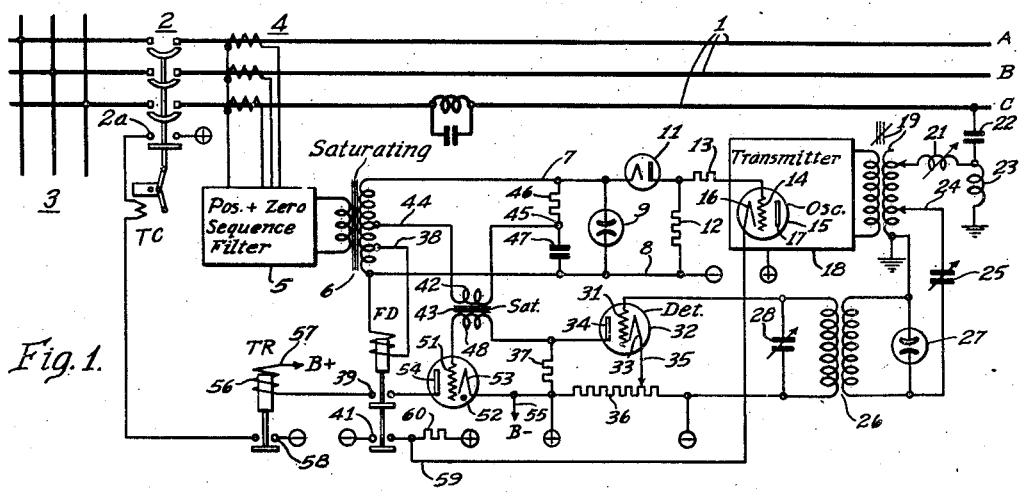

Fig. 1.

Fig. 2. ⎍⎍⎍⎍ Receiver Plate-Voltage,—Internal Fault

Fig. 3. ⎍⎍⎍⎍⎍⎍ Receiver Plate-Voltage,—External Fault

Fig. 4. ―↑―↑―↑―↑― Secondary Voltage of Peaking-Transformer

Fig. 5. ⎍↑⎍⎍⎍⎍ Gas-Tube Grid-Voltage,—Internal Fault
           61

Fig. 6. ⎍↑⎍↑⎍↑⎍↑⎍↑ Gas-Tube Grid-Voltage,— External Fault

WITNESSES:                                    INVENTOR
C. J. Weller.                           Herbert W. Lensner.
Nw. C. Groome                          BY O. B. Buchanan
                                              ATTORNEY Patented Aug. 27, 1946

2,406,616

UNITED STATES PATENT OFFICE 2,406,616

CARRIER-CURRENT PROTECTIVE RELAYING SYSTEM

Herbert W. Lensner, East Orange, N. J., assignor to Westinghouse Electric Corporation, East Pittsburgh, Pa., a corporation of Pennsylvania Application December 8, 1942, Serial No. 468,238

12 Claims. (Cl. 175—294)

My invention relates to relaying systems for protecting alternating-current transmission-lines against faults, and it has particular relation to systems in which the relative phases of the line-currents at the opposite ends of a protected line-section are compared with each other through the medium of a communicating channel, preferably in the form of carrier-currents superimposed upon the line-section. In the usual case of a polyphase line, a suitable phase-sequence network or current-summating means is preferably energized from the line-current for deriving a single-phase relaying-quantity which is satisfactorily responsive to all different types of faults, on whatever phases they may occur, and these single-phase relaying-quantities are compared, as to their relative phase relationships, by means of the protective relaying equipment.

More particularly, my invention relates to that type of carrier-current relaying system in which impulses are obtained from alternate half-cycles of the line-current at each end of the protected line-section, and a differentially energized relay-means is utilized for operating on energy received locally, on alternate half-cycles, and restrained from energy derived from the opposite end of the line-section, on alternate half-cycles of the line-current there. This general type of relaying system is exemplified in the Lenehan Patent No. 2,275,971, March 10, 1942, assigned to the Westinghouse Electric & Manufacturing Company. My present improvement resides principally in the use of peaked impulses of relatively very short duration, derived from alternating half-cycles of the line-current at the relaying station, for providing the operating force for the receiver-relay means, and utilizing flat-topped half-waves of opposite polarity, derived from alternate half-cycles of the line-current at the other end of the line-section, for restraining the receiver-relay means.

The objects of my invention are to provide a novel relaying system of the type just mentioned, and various apparatus and parts of apparatus utilized in carrying out the invention.

My invention is illustrated in an exemplary form of embodiment in the accompanying drawing, wherein:

Figure 1 is a diagrammatic view of circuits and apparatus showing the invention; and Figs. 2 to 6 are curve-diagrams which will be referred to in the explanation.

I have illustrated my invention as it is applied to one end of a line-section of a three-phase transmission line 1, the several phase-conductors being distinguished by the letters A, B and C. As similar equipment will be provided at each end of the line-section, only one end is illustrated. The line-section 1 is connected, through a circuit-breaker 2, to a bus 3, the circuit-breaker being provided with a trip-coil TC and an auxiliary switch 2a which opens when the breaker opens. A bank of line-current transformers 4 is utilized to energize any suitable current-mixing means, such as a phase-sequence filter 5, as shown in the Harder Patent 2,183,646, which combines the positive and zero phase-sequence components of the line-current, and delivers the resultant single-phase relaying-quantity to a saturating transformer 6 having secondary terminals 7 and 8 which are shunted by a voltage-limiting neon glow-tube 9, thus producing, in the relaying-terminals 7 and 8, a flat-topped voltage-wave which is of an approximately constant magnitude throughout an expected range of fault-currents.

In accordance with my invention, the output of the single-phase relaying-terminals 7 and 8 is supplied, through a rectifier 11, to a resistance 12, the rectifier 11 being connected to the terminal 7, and the resistance 12 being connected to the terminal 8, this latter terminal being also connected to a negative source of potential, such as the negative bus (—). The voltage-drop across the resistance 12 is utilized in the control of carrier-current transmission, by having the terminal of the resistance 12 connected, through a grid-resistance 13, to the grid 14 of an oscillator-tube 15, which is illustrated as also comprising a cathode 16 and an anode 17. The oscillator-tube 15 is a part of a carrier-current transmitter, which is indicated diagrammatically at 18, and which is coupled, through a high-frequency transformer 19, to the phase-C line-conductor, the coupling being completed through a variometer 21 and a coupling-capacitor 22. The coupling-capacitor 22 is also connected to ground through a choke-coil 23.

A tap-point 24 on the coupling-transformer 19 is also connected, through a tuning-capacitor 25, to a receiver-transformer 26, the voltage of which is limited by means of a neon glow-tube 27. The receiving-transformer 26 is coupled to a tuned secondary circuit, including a variable capacitor 28, and is utilized to energize the grid 31 of a saturating detector-tube 32, which is utilized as a carrier-current receiver. The receiver-tube 32, in addition to the grid 31, is provided with a cathode 33 and an anode 34, the cathode 33 being connected to a tap-point 35 near the negative end of a potentiometer 36 which is energized from the battery-terminals (+) and (—), and the anode 34 being connected to the positive battery-terminal (+) through a resistance 37.

My invention preferably utilizes a suitable form of fault-detector. While I am not limited to any particular form or kind of fault-detector, it may conveniently be provided by the means of a tap-point 38 on the saturating transformer 6, which is utilized to energize the operating coil of a fault-detector relay FD, which is illustrated as having two make-contacts 39 and 41.

In accordance with my invention, I utilize a suitable form of peaking-device, which is illustrated as being provided by having the primary winding 42 of a saturating transformer 43 connected between the midpoint 44 of the saturating transformer 6, and an intermediate point 45 in a phase-changing impedance, comprising a resistor 46 and a capacitor 47, the resistor 46 being connected between the point 45 and the relaying-terminal 7, and the capacitor 47 being connected between the point 45 and the relaying-terminal 8. The saturating transformer 43 is designed so as to produce peaked voltage-impulses of the order of 3° duration in its secondary winding 48.

In accordance with my invention, the peaked voltage of the secondary winding 48 is added to the voltage-drop which is obtained across the resistor 37 in the plate-circuit of the receiver-tube 32, to energize the grid 51 of a gas-tube 52 which is illustrated as having also a cathode 53 and an anode 54. The cathode 53 is connected, at 55, to the negative terminal B— of a suitable plate-battery source for the gas-tube 52, while the anode 54 is connected in series with the fault-detector contact 39, as a source of suitable tripping-energy, for tripping the circuit-breaker 2, either directly, or through the intremediary of a tripping relay TR. As illustrated, the anode 54 is connected, through the FD contact 39, to the operating coil 56 of a tripping relay TR, and thence it is connected, at 57, to the positive B-battery terminal B+. The tripping relay TR has a make-contact 58 which is utilized to energize the tripping-coil TC through the auxiliary breaker-switch 2a the tripping-energy being obtained from the station-battery (+) and (—).

The other fault-detector contact 41 is connected between the negative battery-terminal (—) and the cathode-lead 59 which is connected to the cathode 16 of the transmitter-oscillator 15, and the cathode-lead 59 is also connected, through a resistance 60, to the positive battery-terminal (+), so that transmission is blocked except when the cathode 16 is connected to the negative terminal through a closure of the fault-detector contact 41.

The operation of the apparatus may now be described. The transmitter-oscillator 15 is designed to generate radio-frequency or carrier-frequency energy whenever its cathode 16 is connected to the negative source (—), and whenever its grid 14 is not impressed with a negative potential with respect to the cathode.

The effect of the rectifier 11, which is energized from the single-phase relaying-terminals 7 and 8, is to cause current to flow through the resistor 12 during alternate half-cycles of the single-phase relaying-voltage of the terminals 7 and 8, in response to a composite phase-sequence quantity of the polyphase line-current at the relaying-station. Since the wave-form of the relaying-voltage across the terminals 7 and 8 is square-topped, and of an approximately constant magnitude, throughout all exceptable fault-conditions, the half-wave pulses of energy which are fed into the resistor 12 through the rectifier 11 are also substantially square-topped and of an approximately constant magnitude. The voltage-drop across the resistor 12 is utilized to make the transmitter-grid 14 sufficiently negative with respect to its cathode 16 to block carrier-current transmission during the half-cycles when current is flowing through the resistance 12, and permitting carrier-current transmission during the intervening half-cycles of the line-current at the relaying station.

The equipment at the other end of the protected line-section (not shown) is similar to the illustrated equipment, and the connections are such that the two carrier-current transmitters are transmitting on successive half-cycles, in the event of a "through" line-current which flows into the line-section at one end and out at the other end.

The receiver-tube 32 is designed to operate in its saturated region, so that it produces a plate-current of approximately fixed magnitude whenever carrier-current energy is applied to its grid 31. The receiver plate-current, passing through the resistance 37, produces a voltage-drop which is utilized to make the grid 51 of the gas-tube 52 negative with respect to its cathode 53. In the case of an internal fault, that is, a fault located within the confines of the protected line-section 1, if the line-currents at the opposite ends of the line-section are exactly 180° out of phase with each other, current entering the line-section at both ends, the voltage-drop in the resistor 37 will be approximately as depicted in Fig. 2, thus representing the potential of the receiver-plate 34 with respect to the potential of the gas-tube cathode 53. In the event of an external fault, with the line-currents in phase with each other at opposite ends of the line-section, the current entering at one end and leaving at the other end, the voltage-drop to the resistor 37 will be substantially as depicted in Fig. 3.

It will be noted that, in the case of the ideal internal fault, represented by Fig. 2, the receiver plate-voltage is in the form of square-topped constant-magnitude half-waves occurring on alternate half-cycles of the line-current at the relaying-station. In case the line-currents flowing into the protected line-section at opposite ends thereof are not exactly 180° out of phase with each other, the periods of carrier-current transmission at the two ends of the line-section will not quite coincide, so that the periods of the receipt of carrier will be lengthened somewhat, as the phase-angle decreases, between the two line-currents at opposite ends of the protected line-section. When these line-currents become exactly in phase, representing the condition of a "through" current corresponding to an external fault, it will be noted that the periods of carrier-current transmission at opposite ends of the protected line-section do not overlap at all, resulting in a substantially continuous flow of receiver plate-current as indicated in Fig. 3.

The peaking-transformer 43 is energized in response to a dephasing means 46—47 which causes the peaks of secondary voltage, in its secondary winding 48, to be produced at an intermediate point, preferably near the middle, of the half-cycles of line-current at the relaying-station, thus producing a peaked secondary voltage as shown in Fig. 4, this voltage consisting of a succession of alternately positive and negative peaked voltage-impulses, of a relatively very short duration, which may be of the order of two or three degrees of the line-current, although I am not limited to any particular duration of these peaked impulses. It will also be noted that the peaks are of a substantially constant magnitude, because the relaying-voltage of the terminals 7 and 8 is held to a substantially constant magnitude by the combined effects of the saturation of the saturating transformer 6 and the voltage-limiting effect of the neon glow-tube 9.

The positive peaks of the peaking-transformer 43 are utilized to control the gas-tube 52, which is fired whenever its grid 51 is made sufficiently positive with respect to its cathode 53. From a comparison of Figs. 2, 3 and 4, it will be noted that the positive peaks of the peaking-transformer occur in substantially the middle of the non-conducting periods of the carrier-current transmitter at the relaying-station, so that, in the event of an internal fault, no carrier is being received by the receiver-tube 32 at the moments when the positive peaks of the peaking-transformer 43 occur, whereas, during an external fault, with "through" current flowing into the line-section at one end and out at the other end, the positive peaks of the peaking-transformer 43 occur substantially in the middle of the period during which carrier-current is being transmitted at the opposite end of the line-section.

The result is that, for an internal fault, the positive peaks of the peaking-transformer 43 are not opposed by negative voltage-impulses received from the receiver-tube 32, so that tripping occurs at the first positive peak 61, as indicated in Fig. 5. This positive peak fires the gas-tube 52 and causes it to become conducting, assuming that the fault-detector contact 39 has already closed, and thereafter the gas-tube 52 remains conducting until its plate-circuit is interrupted, as by an opening of the fault-detector contact 39 after the fault has been cleared from the line. In the event of an external fault, however, the broad half-wave periods of carrier-current transmission at the opposite end of the line-section occur at the same time when the positive peaks of the peaking-transformer 43 occur, with the result that the grid-voltage of the gas-tube 52 never becomes sufficiently positive with respect to its cathode 53 to fire the tube, as depicted in Fig. 6.

In the preceding discussion, I have discussed the positive peaks of the peaking-transformer 43, or the peaks which made the gas-tube grid 51 positive with respect to its cathode 53. I have confined my attention to the positive peaks, because the negative peaks are immaterial, merely making the gas-tube grid 51 more negative with respect to its cathode 53, and thus producing no firing-operation of the tube. It would be obvious, of course, that the negative peaks could be excluded from the gas-tube cathode 53, through suitable rectifying means, but ordinarily the tube can readily withstand the negative voltage-peaks on its grid 51 without failure, so that there is no need to pay any attention to the negative peaks.

It will be noted that my relaying-system is particularly free of the danger of erroneous tripping as a result of any disturbance on the line during an external fault, since any receiver plate-current resulting from such line-disturbance will only further bias the grid of the gas-tube, due to the voltage-drop through the resistor 37 in the receiver plate-circuit. It will further be noted that, by reason of my utilization of short peaks of relay-operating energy, having a duration of very much smaller than the half-cycle durations of the flat-topped restraining half-waves received from line-current derived at the other end of the line-section, my relaying-equipment is not at all sensitive to the exact in-phase or out-of-phase relationships of the line-currents at the opposite ends of the protected line-section, but the phase-relations between these line-currents can vary considerably from the optimum conditions depicted in Figs. 5 and 6, respectively, without altering the condition as to response or non-response of the gas-tube 52, which operates as a receiver-relay means.

While I have illustrated my invention in a single preferred form of embodiment, and while I have explained its manner of operation in accordance with this particular form of embodiment, I wish it to be understood that my invention is susceptible of embodiment in other forms, and that various refinements and simplifications may be adopted without departing from the essential spirit of my invention. I desire, therefore, that the appended claims shall be accorded the broadest interpretation consistent with their language.

I claim as my invention:

1. In an alternating-current line-section having circuit-interrupting means to be controlled for the protection of the line, the combination, with said circuit-interrupting means, of means for at times deriving peaked positive voltage-impulses of a substantially constant magnitude and of relatively very short duration from alternate half-cycles of the line-current at the relaying station, means for at times deriving flat-topped negative voltage-impulses of a substantially constant magnitude and of the order of a half-cycle duration from alternate half-cycles of the line-current at the other end of the line-section, the relative timing of said voltage-impulses being such that the short peaked positive impulses occur at an intermediate point in the long flat-topped impulses when through-current is flowing through the line-section, means for combining said impulses, and circuit-interrupter controlling-means responsive to the short peaked positive impulses when they are not substantially opposed by the long flat-topped impulses when an internal fault occurs within the line-section being protected.

2. In an alternating-current line-section having circuit-interrupting means at both ends of the line-section to be controlled for the protection of the line, the combination with said circuit-interrupting means, of carrier-current transmitting and receiving means associated with each end of the line-section, means for at times deriving peaked positive voltage-impulses of a substantially constant magnitude and of relatively very short duration from alternate half-cycles of the line-current at each end of the line-section, means for at times deriving voltage-impulses of a substantially constant magnitude and of the order of a half-cycle duration from alternate half-cycles of the line-current at each end of the line-section, means responsive to the substantially half-cycle impulses at each end of the line-section for at times causing carrier-current to be transmitted onto the line-section from the transmitting means at that end in a succession of transmitting periods each having a duration of the order of a half-cycle of the line-current, the relative timing of said voltage-impulses being such that the short peaked positive impulses occur at an intermediate point in the transmitting period of the transmitting means at the other end of the line-section when through-current is flowing through the line-section, means energized from the receiving means at each end of the line-section for deriving negative voltage-impulses of a substantially constant magnitude during times of receipt of carrier-current, means for combining the short peaked positive impulses and the receiver-derived negative impulses, and circuit-interrupter controlling-means responsive to the short peaked positive impulses when they are not substantially opposed by the receiver-derived negative impulses when an internal fault occurs within the line-section being protected.

3. Carrier-current controlling-means for an alternating-current line-section, comprising the combination, with a carrier-current transmitter, of means for at times causing carrier-current to be transmitted onto the line-section from the transmitter, means for at such times deriving unidirectional voltage-impulses of a substantially constant magnitude and of the order of a half-cycle duration from alternate half-cycles of the line-current at that end of the line-section, and means for utilizing said impulses to block the transmission of carrier-current at that end of the line-section.

4. In an alternating-current line-section having circuit-interrupting means at both ends of the line-section to be controlled for the protection of the line, the combination, with said circuit-interrupting means, of carrier-current transmitting and receiving means associated with each end of the line-section, fault-detector means for causing carrier-current to be transmitted onto the line-section from the transmitting means at each end during times of fault on the line, means for at such times deriving peaked positive voltage-impulses of a substantially constant magnitude and of relatively very short duration from alternate half-cycles of the line-current at each end of the line-section, means for at such times deriving voltage-impulses of a substantially constant magnitude and of the order of a half-cycle duration from alternate half-cycles of the line-current at each end of the line-section, means responsive to the substantially half-cycle impulses at each end of the line-section for blocking the transmission of carrier at the same end of the line-section, the relative timing of said voltage-impulses being such that the short peaked positive impulses occur at an intermediate point in the transmitting period of the transmitting means at the other end of the line-section when through-current is flowing through the line-section, means energized from the receiving means at each end of the line-section for deriving negative voltage-impulses of a substantially constant magnitude during times of receipt of carrier-current, means for combining the short peaked positive impulses and the receiver-derived negative impulses, and circuit-interrupter controlling-means responsive to the short peaked positive impulses when they are not substantially opposed by the receiver-derived negative impulses when an internal fault occurs within the line-section being protected.

5. In an alternating-current line-section having circuit-interrupting means to be controlled for the protection of the line, the combination, with said circuit-interrupting means, of means for at times deriving voltage-impulses of a substantially constant magnitude from the line-current at the relaying station, phase-changing impedance-means for deriving from said impulses other impulses out of phase therewith, peaking converting-means energized from said other impulses for deriving peaked positive voltage-impulses of a substantially constant magnitude and of relatively very short duration from alternate half-cycles of the line-current at the relaying station, means for at times deriving flat-topped negative voltage-impulses of a substantially constant magnitude and of the order of a half-cycle duration from alternate half-cycles of the line-current at the other end of the line-section, the relative timing of said voltage-impulses being such that the short peaked positive impulses occur at an intermediate point in the long flat-topped impulses derived from the line-current at the other end when through-current is flowing through the line-section, means for combining said short peaked impulses and said long flat-topped impulses derived from the line-current at the other end, and circuit-interrupter controlling-means responsive to the short peaked positive impulses when they are not substantially opposed by the long flat-topped impulses derived from the other end of the line-section when an internal fault occurs within the line-section being protected.

6. In an alternating-current line-section having circuit-interrupting means at both ends of the line-section to be controlled for the protection of the line, the combination, with said circuit-interrupting means, of carrier-current transmitting and receiving means associated with each end of the line-section, fault-detector means for causing carrier-current to be transmitted onto the line-section from the transmitting means at each end during times of fault on the line, means for at such times deriving voltage-impulses of a substantially constant magnitude from the line-current at each end of the line-section, phase-changing impedance-means for deriving from said impulses at each end of the line-section other impulses out of phase therewith, peaking converting-means energized from said other impulses at each end of the line-section for deriving peaked positive voltage-impulses of a substantially constant magnitude and of relatively very short duration from alternate half-cycles of the line-current at that end of the line-section, means responsive to the first-mentioned voltage-impulses derived from the line-current at each end of the line-section for at times causing carrier-current to be transmitted onto the line-section from the transmitting means at that end in a succession of transmitting periods each having a duration of the order of a half-cycle of the line-current, the relative timing of said voltage-impulses being such that the short peaked positive impulses occur at an intermediate point in the transmitting period of the transmitting means at the other end of the line-section when through-current is flowing through the line-section, means energized from the receiving means at each end of the line-section for deriving negative voltage-impulses of a substantially constant magnitude during times of receipt of carrier-current, means for combining the short peaked positive impulses and the receiver-derived negative impulses, and circuit-interrupter controlling-means responsive to the short peaked positive impulses when they are not substantially opposed by the receiver-derived negative impulses when an internal fault occurs within the line-section being protected.

7. Protective-relay means for an alternating-current line-section, comprising means for at times producing, at at least one relaying end of the line-section, long flat-topped negative voltage-impulses of a substantially constant magnitude and of the order of a half-cycle duration in response to alternate half-cycles of the line-current at the other end of the line-section, means for at times producing, at the relaying station, peaked voltage-impulses in response to the line-current at the relaying station in such manner that peaked positive voltage-impulses of a substantially constant magnitude and of relatively very short duration occur at an intermediate point in the long flat-topped impulses when through-current is flowing through the line-section, means for combining said impulses, and controlling-means responsive to the short peaked positive impulses when they are not substantially opposed by the long flat-topped impulses when an internal fault occurs within the line-section being protected.

8. Carrier-current protective-means for at least one terminal of an alternating-current line-section, comprising carrier-current transmitting and receiving means associated with at least one end of the line-section, means at said end of the line-section for at times causing carrier-current to be transmitted onto the line-section from the transmitting means at that end in a succession of transmitting periods each having a duration of the order of a half-cycle of the line-current, means including a receiving-means at said end of the line-section for deriving negative voltage-impulses of a substantially constant magnitude during times of receipt of carrier-current, means at said end of the line-section for at times deriving peaked voltage-impulses from the line-current in such manner that peaked positive voltage-impulses of a substantially constant magnitude and of relatively very short duration occur at an intermediate point between the periods of carrier-current transmission at that end of the line-section, means for combining the short peaked positive impulses and the receiver-derived negative impulses, and controlling-means responsive to the short peaked positive impulses when they are not substantially opposed by the receiver-derived negative impulses when an internal fault occurs within the line-section being protected.

9. Carrier-current protective-means for at least one terminal of an alternating-current line-section, comprising carrier-current transmitting means including an oscillator-tube having a plate-cathode circuit and a tube-controlling circuit, a direct-current plate-voltage supply-circuit for said tube, means for at times causing said transmitting means to transmit carrier-current energy, means for at such times deriving voltage-impulses of a substantially constant magnitude and of the order of a half-cycle duration from the line-current at that end of the line-section, and means for utilizing said impulses to so energize said tube-controlling circuit as to block the transmission of carrier-current at that end of the line-section during alternate half-cycles of the line-current.

10. Carrier-current protective-means for at least one terminal of an alternating-current line-section, comprising carrier-current transmitting and receiving means associated with at least one end of the line-section, said transmitting means including an oscillator-tube having a plate-cathode circuit and a tube-controlling circuit, a direct-current plate-voltage supply-circuit for said tube, fault-detector means for causing said transmitting means to transmit carrier-current energy during times of fault on the line, means for at such times deriving flat-topped voltage-impulses of a substantially constant magnitude and of the order of a half-cycle duration from the line-current at that end of the line-section, means for utilizing said flat-topped impulses to so energize said tube-controlling circuit as to block the transmission of carrier-current at that end of the line-section during alternate half-cycles of the line-current, means including said receiving means for deriving negative voltage-impulses of a substantially constant magnitude during times of receipt of carrier-current, means at said end of the line-section for at times deriving peaked voltage-impulses from the line-current in such manner that peaked positive voltage-impulses of a substantially constant magnitude and of relatively very short duration occur at an intermediate point between the periods of carrier-current transmission at that end of the line-section, means for combining the short peaked positive impulses and the receiver-derived negative impulses, and controlling-means responsive to the short peaked positive impulses when they are not substantially opposed by the receiver-derived negative impulses when an internal fault occurs within the line-section being protected.

11. Protective-relay means for an alternating-current line-section, comprising means for at times producing, at at least one relaying end of the line-section, long other-end-responsive flat-topped negative voltage-impulses of a substantially constant magnitude and of the order of a half-cycle duration in response to alternate half-cycles of the line-current at the other end of the line-section, means for at such times deriving relaying-end-responsive flat-topped voltage-impulses of a substantially constant magnitude from the line-current at the relaying station, phase-changing impedance-means for deriving from said relaying-end-responsive flat-topped impulses other impulses out of phase therewith, peaking converting-means energized from said other impulses for deriving peaked voltage-impulses in response to the line-current at the relaying station in such manner that peaked positive voltage-impulses of a substantially constant magnitude and of relatively very short duration occur at an intermediate point in the long flat-topped impulses derived from the line-current at the other end when through-current is flowing through the line-section, means for combining said short peaked impulses and said long flat-topped impulses derived from the line-current at the other end, and controlling-means responsive to the short peaked positive impulses when they are not substantially opposed by the long flat-topped impulses derived from the other end of the line-section when an internal fault occurs within the line-section being protected.

12. Carrier-current protective-means for at least one terminal of an alternating-current line-section, comprising carrier-current transmitting and receiving means associated with at least one end of the line-section, fault-detector means for causing said transmitting means to transmit carrier-current energy during times of fault on the line, means for at such times deriving flat-topped voltage-impulses of a substantially constant magnitude and of the order of a half-cycle duration from the line-current at that end of the line-section, means for utilizing said flat-topped impulses to cause the transmitting means to transmit carrier-current energy in a succession of transmitting periods each having a duration of the order of a half-cycle of the line-current, means including said receiving means for deriving negative voltage-impulses of a substantially constant magnitude during times of receipt of carrier-current, phase-changing impedance-means for deriving from said flat-topped impulses other impulses out of phase therewith, peaking converting-means energized from said other impulses for deriving peaked voltage-impulses in response to the line-current at the relaying station in such manner that peaked positive voltage-impulses of a substantially constant magnitude and of relatively very short duration occur at an intermediate point between the periods of carrier-current transmission at that end of the line-section, means for combining the short peaked positive impulses and the receiver-derived negative impulses, and controlling-means responsive to the short peaked positive impulses when they are not substantially opposed by the receiver-derived negative impulses when an internal fault occurs within the line-section being protected.

HERBERT W. LENSNER.